Sept. 12, 1933.  H. F. McNALLY  1,926,451
CHEESE PRESS
Filed Aug. 16, 1931  2 Sheets-Sheet 1
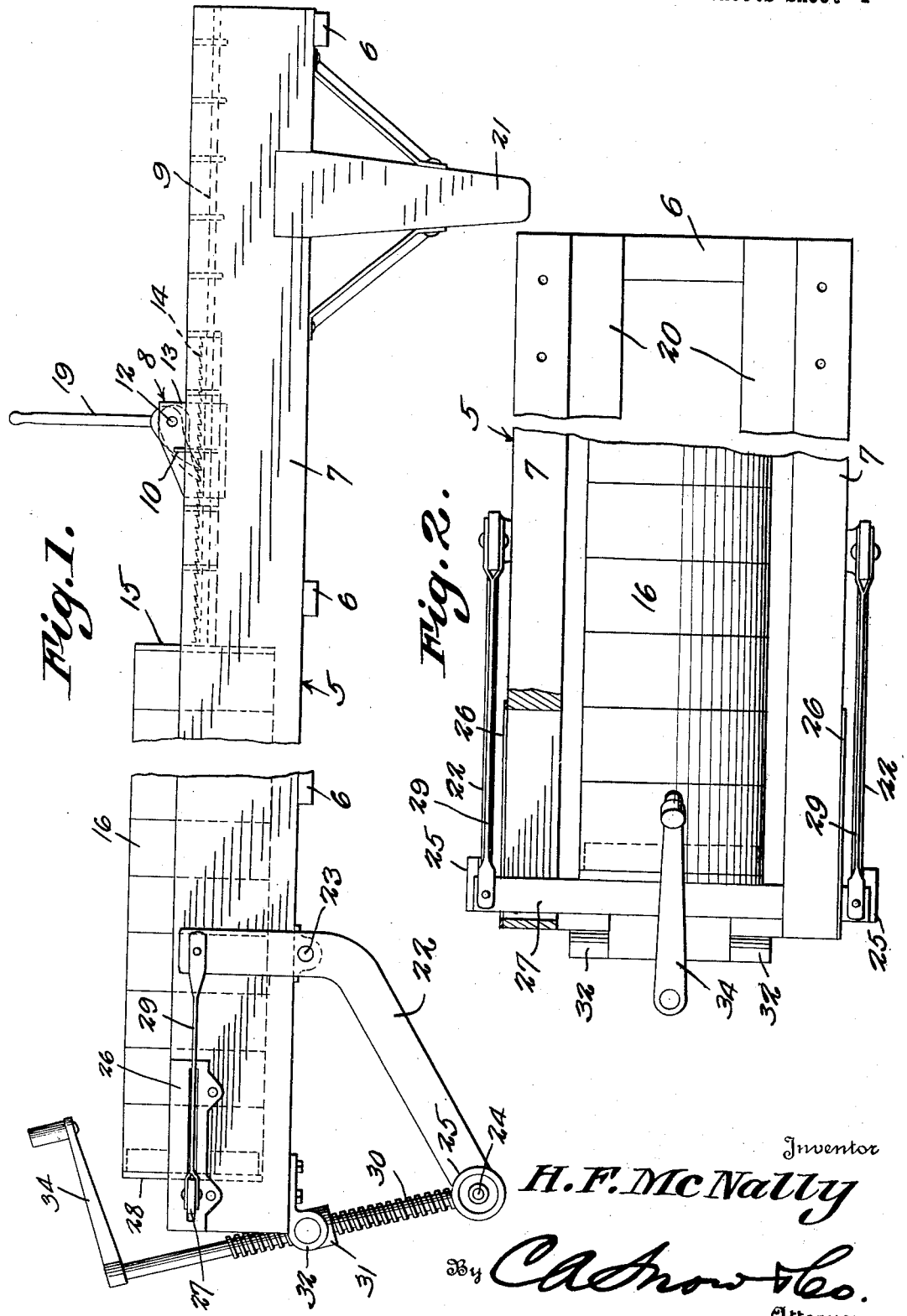
Inventor
H. F. McNally
By C. A. Snow & Co.
Attorneys.

Sept. 12, 1933.  H. F. McNALLY  1,926,451
CHEESE PRESS
Filed Aug. 16, 1931  2 Sheets-Sheet 2
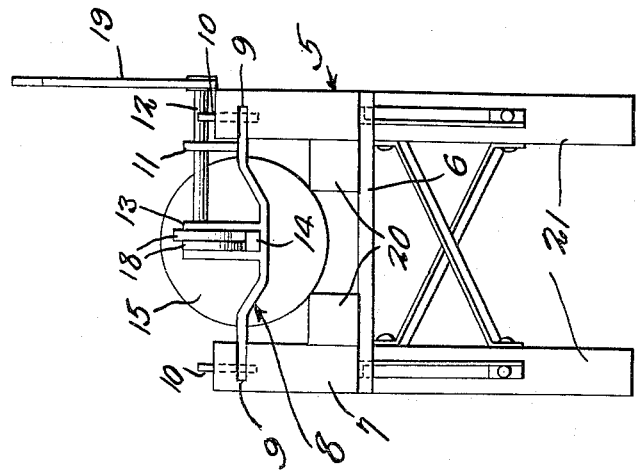
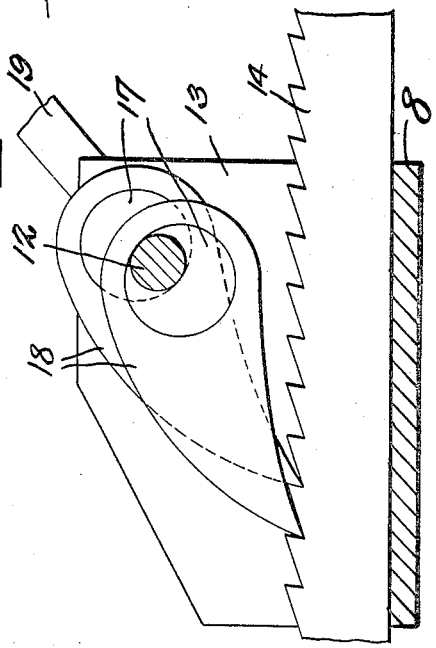
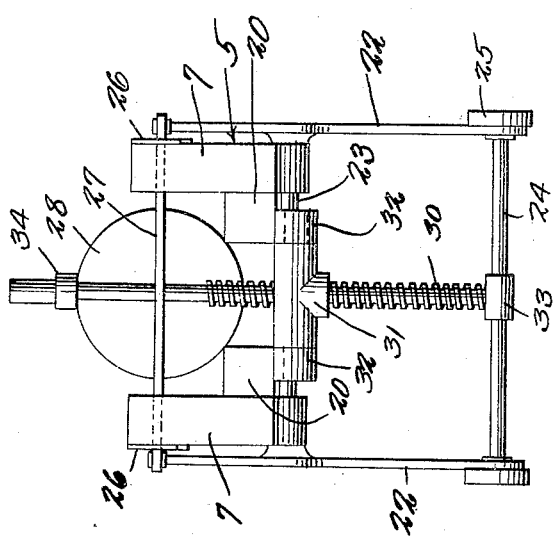
Inventor
H. F. McNally
By C. A. Snow & Co.
Attorneys Patented Sept. 12, 1933

1,926,451

UNITED STATES PATENT OFFICE 1,926,451

CHEESE PRESS

Hugh F. McNally, Richland Center, Wis.

Application August 16, 1931. Serial No. 557,415

2 Claims. (Cl. 100—55)

This invention relates to presses, and more particularly to cheese presses, designed for pressing cheese within their hoops.

The primary object of the invention is to provide means for exerting a continuous and even pressure on the cheese under operation, for any desired length of time, the press being so constructed that the weight of the cheese and press acts to move the presser head forwardly or longitudinally of the body portion of the press, exerting a pressure on the cheese curd placed in the hoops.

Another object of the invention is to provide means for relieving the pressure on the presser head, when it becomes necessary to remove the cheese and hoops from the press.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a side elevational view of a press constructed in accordance with the invention.

Figure 2 is a fragmental plan view of one end of the press.

Figure 3 is an end elevational view of the press.

Figure 4 is an end elevational view illustrating the opposite end of the press.

Figure 5 is an enlarged detail view showing the ratchet bar and ratchet members cooperating therewith.

Referring to the drawings in detail, the press includes a body portion in the form of a frame indicated generally by the reference character 5, which frame comprises a bottom member 6, and side members 7 which are disposed along the longitudinal edges of the bottom member, as clearly shown by the drawings. These side members 7 are substantially wide, and extend appreciable distances above the bottom member 6, where they provide a support for the ratchet bar supporting member 8.

Longitudinal grooves 9 are formed in the inner side faces of the side members 7 and accommodate the ends of the ratchet bar supporting member 8, as clearly shown by Figure 4 of the drawings.

Vertical openings are formed in the side members 7, which openings accommodate the pins 10 that also extend through openings formed in the ends of the ratchet bar supporting member 8, to hold the ratchet bar supporting member in various positions of adjustment.

Extending upwardly from the ratchet bar supporting member 8, next to the end thereof, is an arm 11 which is formed with an opening to receive the shaft 12 that has its inner end supported in openings formed in the upstanding arms 13, which are disposed intermediate the ends of the ratchet bar supporting member 8.

The space between the upstanding arms 13, provides a guide for the ratchet bar 14, that carries the head 15 at its inner end, the head 15 being of a diameter to completely cover one end of the innermost cheese hoop, the cheese hoops being indicated by the reference character 16.

Eccentrics 17 are arranged on the inner end of the shaft 12, and operate in openings formed in the ratchets 18 in such a way, that upon rotary movement of the shaft 12, the ratchets 18 will be moved over the ratchet bar 14 in such a manner as to feed the ratchet bar and head carried thereby forwardly, thereby providing a stop for the cheese hoops, during the pressing operation.

A hand lever 19 is mounted on one end of the shaft 12, and affords means whereby the operator may rotate the shaft 12 to move the ratchet bar 14 to its proper adjusted position.

Spaced longitudinal bars 20 are secured to the bottom member 6, and are arranged adjacent to the side members 7, where they provide a support for the cheese hoops 16, during the pressing operation.

The reference character 21 designates stationary supporting legs, which are secured to the body portion 5, near one end thereof. The opposite end of the body portion 5 is supported by means of the pivoted legs 22, which are mounted on the shaft 23, the upper ends of the pivoted legs 22 extending appreciable distances above the shaft 23, as clearly shown by Figure 1 of the drawings.

These pivoted legs 22 are connected at their free ends by means of the axle 24 on which the wheels 25 are mounted, and since the pivoted legs 22 are extended forwardly, it will be obvious that the weight of the body portion and material being pressed, will act to move the upper ends of the pivoted legs 22 toward the right in Figure 1.

Elongated openings are formed in the side members 7, near the front ends thereof, the openings being guarded by the slotted plates 26, which are secured to the side members.

The reference character 27 designates the supporting bar for the presser head 28, which is of a diameter to fit within the foremost cheese hoop, to exert a pressure on the cheese curd supported within the cheese hoops.

Connecting links 29 connect the supporting bar 27 with the upper ends of the pivoted legs 22, so that movement of the upper ends of the legs will be directed to the supporting bar 27, to accomplish the purpose of the invention.

In order that the pressure of the presser head 28 may be relieved, a screw 30 is provided, which screw operates through the threaded member 31 that is pivotally mounted within the bearings 32, the lower end of the screw 30 contacting with the bearing block 33, which is secured to the axle 24, at a point intermediate the ends thereof.

On the upper end of the screw 30 is a handle 34, by means of which the screw 30 may be operated.

Thus it will be seen that due to this construction, the screw 30 may be operated to move the lower ends of the pivoted legs 22 away from the threaded member 31, thereby moving the presser head to a position, away from the cheese hoops with which it is associated to permit the cheese hoops to be removed from the presser.

In the use of the device, the desired number of cheese hoops containing cheese curd, are placed end to end on the body portion 5, whereupon the head 15 is moved to a position to engage the innermost hoop. The handle 34 is now operated to allow the weight of the body portion and cheese curd supported thereby to direct a downward pressure on the pivoted legs 22.

It is obvious that the pressure so directed to the cheese hoops, is continuous and even, to the end that a much better grade of cheese is insured.

Having thus described the invention, what is claimed is:

1. A cheese curd press comprising a body portion for supporting cheese hoops, stationary legs supporting one end of the body portion, leg members pivotally mounted near the opposite end of the body portion, the lower ends of the pivoted leg members extending forwardly, a rod connecting the pivoted leg members, the upper ends of the pivoted leg members extending above the pivot points thereof, a presser head movable through the body portion and pressing against the cheese curd contained in the end loop of the series of cheese hoops positioned in the body portion, a supporting screw pivotally mounted at one end of the body portion and disposed near the pivoted leg members and engaging the rod to move the body portion vertically with respect to the leg members, and relieving the pressure on the presser head.

2. A cheese curd press comprising an elongated body portion for supporting a series of cheese hoops containing cheese curd, an adjustable head at one end of the body portion and engaging the cheese hoop at one end of the series of hoops, to hold the hoops against movement, stationary legs at one end of the body portion, a pair of leg members pivotally mounted on the body portion and having forwardly extended lower ends, a rod connecting said lower ends the upper ends of the leg members extending above the pivot point of the leg members, a presser head for pressing against the cheese curd, links connecting the presser head and upper ends of the leg members to move the presser head under the weight of the material supported by the body portion, and a supporting screw pivotally connected with the body portion positioned so as to engage the rod and adapted to support the weight of the body portion relieving the pivoted leg members of the weight.

HUGH F. McNALLY.